United States Patent

Priestley et al.

[15] 3,670,027

[45] June 13, 1972

[54] DETERGENT COMPOSITIONS

[72] Inventors: Hill M. Priestley, North Bergen; James H. Wilson, Demarest, both of N.J.

[73] Assignee: Lever Brothers Company, New York, N.Y.

[22] Filed: Aug. 19, 1970

[21] Appl. No.: 65,359

Related U.S. Application Data

[60] Division of Ser. No. 869,985, Aug. 25, 1969, which is a continuation of Ser. No. 647,333, June 20, 1967, abandoned, which is a continuation-in-part of Ser. No. 365,487, May 6, 1964, abandoned, which is a continuation-in-part of Ser. Nos. 725,505, April 1, 1958, abandoned, and Ser. No. 60,546, Oct. 5, 1960, abandoned.

[52] U.S. Cl. ........................................260/593 R
[51] Int. Cl. ........................................C07c 49/76
[58] Field of Search.....................................260/593

[56] References Cited

UNITED STATES PATENTS

| | | | |
|---|---|---|---|
| 2,313,621 | 3/1943 | Bruson | 260/593 R |
| 2,363,462 | 11/1944 | Morey | 260/593 R |

*Primary Examiner*—Daniel D. Horwitz
*Attorney*—Louis F. Kline, Jr., Melvin H. Kurtz, Edgar E. Ruff and Earl R. Ross

[57] ABSTRACT

Novel sulfoxides having the general formula

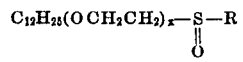

wherein X is O when R is a monovalent radical selected from the group consisting of glyceryl, acetonyl, 2-chloroethyl, 2-iodoethyl, 2-mercaptomethyl ethyl, 2-methoxyethyl, 2-ethoxy-ethyl, and 2-allyloxyethyl, and X is an integer from 1 to 2 when R is methyl. These sulfoxides are useful as suds-stabilizing additives.

As intermediates for the preparation of sulfoxides that are useful as suds-stabilizing additives, there are also disclosed the compound dodecyloxyethoxyethyl chloride and sulfides having the general formula

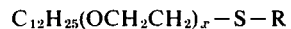

wherein X is O when R is the monovalent acetonyl radical, and X is an integer from 1 to 2 when R is the methyl radical.

1 Claim, No Drawings

DETERGENT COMPOSITIONS

This application is a divisional of co-pending application Ser. No. 869,985, filed on Aug. 25, 1969, which is a streamlined continuation of application Ser. No. 647,333 filed June 20, 1967 and now abandoned, which in turn was a continuation-in-part of application Ser. No. 365,487 filed May 6, 1964, also now abandoned, which in turn was a continuation-in-part of our applications Ser. Nos. 725,505 filed Apr. 1, 1958, and 60,546, filed Oct. 5, 1960, now abandoned.

The present invention relates to novel dialkyl monosulfoxides and related compounds which are useful either as detergents and foam stabilizers or as intermediates in the preparation of compounds which are useful as detergents and foam stabilizers.

The novel sulfoxides of the present invention have the general formula

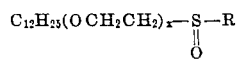

wherein X is O when R is a monovalent radical selected from the group consisting of glyceryl, acetonyl, 2-chloroethyl, 2-iodoethyl, 2-mercaptomethyl ethyl, 2-methoxyethyl, 2-ethoxyethyl, and 2-allyloxyethyl, and X is an integer from 1 to 2 when R is methyl.

The novel sulfides of the resent invention have the general formula

wherein X is O when R is the monovalent acetonyl radical, and X is an integer from 1 to 2 when R is the methyl radical.

Alkyl sulfoxides having a long chain fatty acid residue are known to have surface active properties. U.S. Pat. No. 2,787,595 to Webb discloses the use of alkyl sulfoxides as the essential active ingredient in detergent compositions. According to Webb, the sulfoxides may be employed per se as the essential active ingredient in detergent compositions, but preferably are employed in combination with inorganic "builder" salts. It is also stated in the patent that other synthetic detergents may be employed as detergency supplements in combination with the sulfoxides and that foam stabilizers may be added.

It is common practice in the industry to include foam stabilizers in detergent compositions to improve the persistence and stability of the foam produced by agitation of the washing solution containing the detergent composition. These foam stabilizers are particularly useful in detergent compositions based upon organic non-soap synthetic detergent compounds.

In accordance with the present invention, novel compounds are provided from the group consisting of dodecyl glyceryl sulfoxide, dodecyloxyethyl methyl sulfoxide, dodecyl acetonyl sulfoxide, dodecyl 2-chloroethyl sulfoxide, dodecyl 2-hydroxyethyl sulfoxide, dodecyloxyethyoxyethyl methyl sulfoxide, dodecyl 2-iodoethyl sulfoxide, dodecyl 2-mercaptomethylethyl sulfoxide, dodecyl 2-(2-hydroxy) ethoxyethyl sulfoxide, dodecyl 2-methoxyethyl sulfoxide, dodecyl 2-ethoxyethyl sulfoxide, dodecyl 2-allyloxyethyl sulfoxide, dodecyl acetonyl sulfide, dodecyloxyethyl methyl sulfide, dodecyloxyethoxyethyl methyl sulfide, and dodecyloxyethoxyethyl chloride.

The specific compounds of this invention are:

Dodecyl glyceryl sulfoxide—$C_{12}H_{25}SOCH_2CHOHCH_2OH$
Dodecyloxyethyl methyl sulfoxide—$C_{12}H_{25}OCH_2CH_2SOCH_3$
Dodecyl acetonyl sulfoxide—$C_{12}H_{25}SOCH_2COCH_3$
Dodecyl 2-chloroethyl sulfoxide—$C_{12}H_{25}SOCH_2CH_2Cl$
Dodecyl 2-hydroxyethyl sulfoxide—$C_{12}H_{25}SOCH_2CH_2OH$
Dodecyloxyethoxyethyl methyl sulfoxide—$C_{12}H_{25}OCH_2CH_2OCH_2CH_2SOCH_3$
Dodecyl 2-iodoethyl sulfoxide—$C_{12}H_{25}SOCH_2CH_2I$
Dodecyl 2-mercaptomethylethyl sulfoxide—$C_{12}H_{25}SOCH_2CH_2ch_3$
Dodecyl-2-(2-hydroxy)ethoxyethyl sulfoxide—$C_{12}H_{25}SOCH_2CH_2ch_2CH_2OH$
Dodecyl 2-methoxyethyl sulfoxide—$C_{12}H_{25}SOCH_2CH_2OCH_3$
Dodecyl 2-ethoxyethyl sulfoxide—$C_{12}H_{25}SOCH_2CH_2OC_2H_5$
Dodecyl 2-allyloxyethyl sulfoxide—$C_{12}H_{25}SOCH_2CH=CH_2$
Dodecyl acetonyl sulfide—$C_{12}H_{25}SCH_2COCH_3$
Dodecyloxyethyl methyl sulfide—$C_{12}H_{25}OCH_2CH_2SCH_3$
Dodecyloxyethoxyethyl methyl sulfide—$C_{12}H_{25}OCH_2CH_2O CH_2CH_2SCH_3$
Dodecyloxyethoxyethyl chloride—$C_{12}H_{25}OCH_2CH_2OCH_2CH_2Cl$ A preferred class within the above described sulfoxides include dodecyl glyceryl sulfoxide, $C_{12}H_{25}SOCH_2CHOHCH_2OH$; dodecyloxyethyl methyl sulfoxide, $C_{12}H_{25}OCH_2CH_2SOCH_3$; and dodecyloxyethoxyethyl methyl sulfoxide, $C_{12}H_{25}OCH_2CH_2OCH_2CH_2SOCH_3$. These material are exceptionally suitable in the presence of household bleach.

Another preferred class within the broad class described above are dodecyl 2-chloroethyl sulfoxide, $C_{12}H_{25}SOCH_2CH_2Cl$ and dodecyl 2-iodoethyl sulfoxide, $C_{12}H_{25}SOCH_2CH_2I$. These compounds are useful as intermediates in the preparation of a wide variety of other sulfoxides having the aforementioned desired properties.

It has been found that the presence of small amounts of the sulfoxides described above improve the stability of the foam produced by agitating aqueous solutions of suds-producing materials selected from the group consisting of anionic, ampholytic and nonionic organic synthetic detergents. Certain of the sulfoxides, as well as the sulfides and chlorides are useful in preparing known or novel sulfoxides which are in turn useful as detergents and suds boosters.

The following table lists the novel compounds of this invention together with their formula, their melting point and the melting point of the corresponding sulfone.

TABLE I

| No. | Name | Formula | Melting point, °C. | Melting point o sulfone °C |
|---|---|---|---|---|
| 1 | Dodecyl glyceryl sulfoxide | $C_{12}H_{25}SOCH_2CHOHCH_2OH$ | 83 | 93 |
| 2 | Dodecyloxyethyl methyl sulfoxide | $C_{12}H_{25}OCH_2CH_2SOCH_3$ | 43 | 66 |
| 3 | Dodecyl acetonyl sulfoxide | $C_{12}H_{25}SOCH_2COCH_3$ | 84 | 81 |
| 4 | Dodecyl 2-chloroethyl sulfoxide | $C_{12}H_{25}SOCH_2CH_2Cl$ | 75 | 62 |
| 5 | Dodecyl 2-hydroxyethyl sulfoxide | $C_{12}H_{25}SOCH_2CH_2OH$ | 71 | --- |
| 6 | Dodecyloxyethoxyethyl methyl sulfoxide | $C_{12}H_{25}OCH_2CH_2OCH_2CH_2SOCH_3$ | 43 | 44 |
| 7 | Dodecyl 2-iodoethyl sulfoxide | $C_{12}H_{25}SOCH_2CH_2I$ | 74 | 100 |
| 8 | Dodecyl 2-mercaptomethylethyl sulfoxide | $C_{12}H_{25}SOCH_2CH_2SCH_3$ | 68 | 71 |
| 9 | Dodecyl-2-(2-hydroxy)ethoxyethyl sulfoxide | $C_{12}H_{25}SOCH_2CH_2OCH_2CH_2OH$ | 54 | 60 |
| 10 | Dodecyl 2-methoxyethyl sulfoxide | $C_{12}H_{25}SOCH_2CH_2OCH_3$ | 58 | 48 |
| 11 | Dodecyl 2-ethoxyethyl sulfoxide | $C_{12}H_{25}SOCH_2CH_2OC_2H_5$ | 57 | 47 |
| 12 | Dodecyl 2-allyloxyethyl sulfoxide | $C_{12}H_{25}SOCH_2CH_2OCH_2CH=CH_2$ | 54 | 46 |

| No. | Name | Formula | Boiling point, °C. (mm.) |
|---|---|---|---|
| 13 | Dodecyl acetonyl sulfide | $C_{12}H_{25}SCH_2COCH_3$ | 150–160 (1.0) |
| 14 | Dodecyloxyethyl methyl sulfide | $C_{12}H_{25}OCH_2CH_2SCH_3$ | 140 (1.0) |
| 15 | Dodecyloxyethoxyethyl methyl sulfide | $C_{12}H_{25}OCH_2CH_2OCH_2CH_2SCH_3$ | 155 (1.5) |
| 16 | Dodecyloxyethoxyethyl chloride | $C_{12}H_{25}OCH_2CH_2OCH_2CH_2Cl$ | 150 (1.5) |

NOTE.—M.P. of disulfone 171° C.

Of the 12 sulfoxides listed in Table I, Nos. 1, 2, 3, 5 and 6 were prepared by the oxidation of the corresponding sulfides with concentrated nitric acid or with hydrogen peroxide in accordance with the following:

(a) 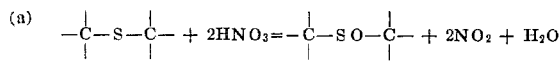

(b) 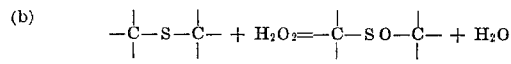

The sulfides, in turn, had been obtained by warming an alcoholic solution of the sodium mercaptide with a halide:

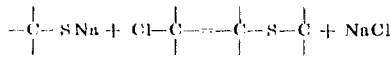

Thus, sodium dodecyl mercaptide when treated with glycerol alphamonochlorohydrin, give dodecyl thioglyceryl ether; with chloroacetone, dodecyl acetonyl sulfide; and with ethylene chlorohydrin, dodecyl 2-hydroxyethyl sulfide:

$C_{12}H_{25}SNa + ClCH_2CHOHCH_2OH = C_{12}H_{25}SCH_2CHOHCH_2OH + NaCl$ $C_{12}H_{25}SNa + ClCH_2COCH_3 = C_{12}H_{25}SCH_2COCH_3 + NaCl$ $C_{12}H_{25}SNa + ClCH_2CH_2OH = C_{12}H_{25}SCH_2CH_2OH + NaCl$ (The dodecyl 2-hydroxyethyl sulfide had also been prepared from $C_{12}H_{25}Br + NaSCH_2CH_2OH$) Dodecyl acetonyl sulfide, $C_{12}H_{25}SCH_2COCH_3$, is novel. Similarly, sodium methyl mercaptide, when treated with dodecyloxyethyl chloride yielded dodecyloxyethyl methyl sulfide; and dodecyloxyethoxyethyl chloride gave dodecyloxyethoxyethyl methyl sulfide:

$CH_3SNa + ClCH_2CH_2OC_{12}H_{25} = C_{12}H_{25}OCH_2CH_2SCH_3 - NaCl$ $CH_3SNa + ClCH_2CH_2OCH_2CH_2OC_{12}H_{25} = C_{12}H_{25}OCH_2CH_2OCH_2CH_2SCH_3 + NaCl$

Both sulfides and the dodecyloxyethoxyethyl chloride, $C_{12}H_{25}OCH_2CH_2OCH_2CH_2Cl$, are novel.

The dodecyl 2-chloroethyl sulfoxide was prepared by oxidation of the known dodecyl 2-chloroethyl sulfide with sodium hypochlorite and with nitric acid:

$C_{12}H_{25}SCH_2CH_2Cl + 2 HNO_3 = C_{12}H_{25}SOCH_2CH_2Cl + 2 NO_2 + HO$

Since this sulfoxide is also a halide, it can enter into reaction with sodium mercaptides and alcoholates, to yield new compounds which already contain a sulfoxide group:

$C_{12}H_{25}SOCH_2CH_2Cl + NaSCH_3 = C_{12}H_{25}SOCH_2CH_2SCH_3 + NaCl$ $C_{12}H_{25}SOCH_2CH_2Cl + NaOCH_2CH_2OH = C_{12}H_{25}SOCH_2CH_2OCH_2CH_2OH + NaCl$ $C_{12}H_{25}SOCH_2CH_2Cl + NaOCH_3 = C_{12}H_{25}SOCH_2CH_2OCH_3 + NaCl$ $C_{12}H_{25}SOCH_2CH_2Cl + NaOC_2H_5 = C_{12}H_{25}SOCH_2CH_2OC_2H_5 + NaCl$ $C_{12}H_{25}SOCH_2CH_2Cl + NaOCH_2CH = CH_2 = C_{12}H_{25}SOCH_2CH_2OCH_2CH = CH_2 + NaCl$

In this manner, there was prepared, reading the right hand formulas above from top to bottom: dodecyl 2-mercaptomethylethyl sulfoxide, dodecyl 2-(2-hydroxy)ethyoxyethyl sulfoxide, dodecyl 2-methoxyethyl sulfoxide, dodecyl 2-ethoxyethyl sulfoxide, and dodecyl 2-allyloxyethyl sulfoxide.

For the preparation of the known dodecyl vinyl sulfoxide, $C_{12}H_{25}SOCH = CH_2$, by a new procedure, i.e. by removal of hydrohalide from dodecyl 2-haloethyl sulfoxide —

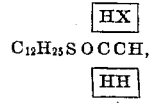

a more reactive halide was desired. This was achieved by refluxing dodecyl 2-chloroethyl sulfoxide with sodium iodide in acetone solution, whereby dodecyl 2-iodoethyl sulfoxide was formed:

$C_{12}H_{25}SOCH_2CH_2Cl + NaI = C_{12}H_{25}SOCH_2CH_2I + NaCl$.

The iodosulfoxide can, of course, be used in place of the dodecyl 2-chloroethyl sulfoxide in reactions with sodium mercaptides and alcoholates. The time required for the completion of such reactions is greatly lessened.

Thus, of the listed sulfoxides, roughly a half were prepared by first forming the sulfide from the sodium mercaptide and halide, and oxidizing this to the sulfoxide. The other half were obtained by the reaction of a halosulfoxide with a sodium mercaptide or alcoholate. In the latter case, no oxidation was necessary. The new intermediates (nonsulfoxides) are:

1. dodecyl acetonyl sulfide   $C_{12}H_{25}SCH_2COCH_3$
2. dodecyloxyethyl methyl sulfide   $C_{12}H_{25}OCH_2CH_2SCH_3$
3. dodecyloxyethyoxyethyl methyl sulfide   $C_{12}H_{25}OCH_2CH_2OCH_2CH_2SCH_3$
4. dodecyloxyethoxyethyl chloride   $C_{12}H_{25}OCH_2CH_2OCH_2CH_2Cl$

EXAMPLE 1

Dodecyl acetonyl sulfide, $C_{12}H_{25}SCH_2COCH_3$. To a mixture of 101 g. dodecyl mercaptan and 300 ml. 3A alcohol, there was added, with stirring, a solution of 22 g. sodium hydroxide in 30 ml. of distilled water. The sodium mercaptide solution was then treated with 51 g. chloroacetone, a few grams at a time, with cooling and stirring. The mixture was allowed to stand at room temperature for half an hour, and then poured into 2 liters of water. The oil was extracted with 400 ml. ether, the ether solution washed with water, and dried over anhydrous sodium sulfate. The solvent was distilled off, and the residue fractionated. The yield of dodecyl acetonyl sulfide was 86 g. (67 percent of the theory), b.p. 155°–160° C./1.0 mm. (bath temp. 195° C.). The phenylhydrazone derivative melted at 43° C; the oxime was an oil; and the semicarbazone melted at 81° C.

Dodecyl acetonyl sulfoxide, $C_{12}H_{25}SOCH_2COCH_3$. A solution of 5.0 grams dodecyl acetonyl sulfide in 30 ml. acetone was treated with 1.75 ml. of 30 percent hydrogen peroxide. The solution was refluxed for 15 minutes on a water bath kept at 60° C. The reaction mixture was freed of the solvent by vacuum evaporation with a water pump on a water bath at 40° C. The solid residue was triturated with 50 ml. Skellysolve B in a mortar and filtered by suction. The material on the filter was washed with 10 ml. light petroleum ether. The yield of the sulfoxide was 4.1 grams, 75 percent of theory, and it had a melting point of 84° C. One gram, after recrystallization from 40 ml. Skellysolve B, yielded 0.85 gram of a product having a melting point of 84° C.; phenylhydrazone, melting point 73° C.

The ketosulfoxide is soluble in aqueous sodium hydroxide solution, in which it foams exceedingly. On acidification, the ketosulfoxide is recovered unchanged. Dodecyl acetonyl sulfoxide is much more stable in strong alkali than is the corresponding ketosulfone. Thus, the ketosulfoxide is recovered unchanged by refluxing it in 10 percent sodium hydroxide for 4 hours. A solution of dodecyl acetonyl sulfoxide is 10 percent aqueous sodium hydroxide was kept unchanged in the 52° C. oven for 2 weeks.

EXAMPLE 2

As was mentioned above, it was in the course of the preparation of the known dodecyl vinyl sulfoxide by a new route, that the following three new sulfoxides were obtained:
Dodecyl 2-hydroxyethyl sulfoxide, $C_{12}H_{25}SOCH_2CH_2OH$
Dodecyl 2-chloroethyl sulfoxide, $C_{12}H_{25}SOCH_2CH_2Cl$
Dodecyl 2-iodoethyl sulfoxide, $C_{12}H_{25}SOCH_2CH_2I$
The reactions involved are as follows:
1. $C_{12}H_{25}Br + NaSCH_2CH_2OH = C_{12}H_{25}SCH_2CH_2OH + NaBr$.
2. $C_{12}H_{25}SCH_2CH_2OH + SOCl_2 = C_{12}H_{25}SCH_2CH_2CL + SO_2 + HCl$
3. $C_{12}H_{25}SCH_2CH_2Cl + 2 HNO_3 = C_{12}H_{25}SOCH_2CH_2Cl + 2NO_2 + H_2O$.
4. $C_{12}H_{25}SOCH_2CH_2Cl + NaI = C_{12}H_{25}SOCH_2CH_2I + NaCl$ 5. $C_{12}H_{25}SOCH_2CH_2I + NaOH = C_{12}H_{25}SCH = CH_2 + NaI + H_2O$.

Dodecyl 2-Hydroxyethyl Sulfide, $C_{12}H_{25}SCH_2CH_2OH$. Metallic sodium, 23 g., was dissolved in 410 ml. 3A, 95 percent alcohol, and to this was added 78 g. of 2-mercaptoethanol, $HSCH_2CH_2OH$. There was then introduced 249 g. dodecyl bromide, dropwise, with stirring. Heat was evolved. The mixture was refluxed for half an hour. Analysis showed that no mercaptide was present and that this time interval had been sufficient for completion of the reaction. The product was extract-d with 500 ml. ether, the ethereal solution washed five times with water, and dried (sodium sulfate). The ether was removed, and the residue vacuum distilled, with steam passing through the condenser jacket. There was obtained 229 g. of dodecyl 2-hydroxyethyl sulfide, b.p. 177° C./2.5 mm. (oil bath temp. 220° C.).

Dodecyl 2-chloroethyl sulfide, $C_{12}H_{25}SCH_2CH_2Cl$. Thionyl chloride, 128 ml., was added, with cooling and stirring, to a mixture of 70 ml. pyridine and 228 g. dodecyl 2-hydroxyethyl sulfide. At first, the addition was slow, being guided by the amount of heat evolved. Later, as the heat of reaction declined, the addition was more rapid. The mixture was then heated, with stirring, at 120° C. for 1.5 hours. Excess thionyl chloride was decomposed by the addition of 100 ml. water at 60° C. The product was extracted with 500 ml. ether, washed with water, and dried overnight with anhydrous sodium sulfate. After removal of the ether on the water bath, the residue was heated on an oil bath under the vacuum of a water pump. The intermediate chlorosulfinate, $C_{12}H_{25}SCH_2CH_2OSOCl$, is quite stable, and was heated at 200° C. under reduced pressure to drive out all of the sulphur dioxide, leaving behind the dodecyl 2-chloroethyl sulfide. This was fractionated, giving 149 g., b.p. 172° C./2.0 mm. (bath temp. 222° C.).

Dodecyl 2-chloroethyl sulfoxide, $C_{12}H_{25}SOCH_2CH_2Cl$. Dodecyl 2-chloroethyl sulfide, 50 g., was added in small portions, with cooling and stirring to 80 ml. concentrated nitric acid. The product was poured into 800 ml. water. Filtration was slow, hence the suspension was centrifuged. The supernatant liquid was decanted, the residual product stirred up with water in the centrifuge tubes, and recentrifuged. This was repeated, using as a wash 50% 3A alcohol. The solid was finally filtered on a Buchner funnel, and dried. The yield of dodecyl 2-chloroethyl sulfoxide was 48 g., m.p. 75° C.

Dodecyl-2-chloroethyl sulfone, $C_{12}H_{25}SO_2CH_2CH_2Cl$. The sulfone derivatives had been prepared from the sulfide by treatment with excess hydrogen peroxide in glacial acetic acid. The mixture was ether refluxed for one or two hours, or allowed to stand at room temperature for 48 hours. As an example, the preparation of dodecyl 2-chloroethyl sulfone is described. Dodecyl 2-chloroethyl sulfide, 10 g., was mixed with 100 ml. glacial acetic acid and 40 ml. of 30 percent hydrogen peroxide. The sulfide had not all dissolved, and an oil was present. The mixture was refluxed for 1.5 hours. Initially, the oil was still present at the reflux temperature, but afterwards, a homogenous solution was obtained. On cooling the solution, the sulfone crystallized out. It was filter-d, washed with 10 ml. glacial acetic acid and then with 4 ml. distilled water. The yield of dry dodecyl 2-chloroethyl sulfone was 8.4 g., m.p. 62° C.

Dodecyl 2-Iodoethyl sulfoxide, $C_{12}H_{25}SOCH_2CH_2I$. A mixture of 40 g. dodecyl 2-chloroethyl sulfoxide (this sample had been freed of traces of nitric acid by washing with bicarbonate solution to alkalinity), 45 g. sodium iodide, and 30 ml. acetone was refluxed for 5 hours. The acetone solution was decanted from the sodium chloride, and the salt rinsed with a little acetone. The combined acetone solution was refluxed for an additional 7 hours. Most of the acetone was evaporated. The residue was treated with water, filtered, and the moist solid was recrystallized from 200 ml. 3A alcohol. There was obtained 28.4 g. of dodecyl 2-iodoethyl sulfoxide, m.p. 74° C.

Dodecyl vinyl sulfoxide, $C_{12}H_{25}SOCH = CH_2$. A suspension of 5.0 g. dodecyl 2-iodoethyl sulfoxide in 25 ml. 10% sodium hydroxide was heated at 80° C., with stirring, for two hours. The mixture was poured into 300 ml. ice water. After an hour, the solid was filtered, washed with water, and dried. The yield of dodecyl vinyl sulfoxide was 3.2 g., m.p. 42° C.

Dodecyl 2-hydroxyethyl sulfoxide, $C_{12}H_{25}SOCH_2CH_2OH$. Dodecyl 2-hydroxyethyl sulfide, 9.0 g., was gradually added to 10 ml. concentrated nitric acid, with cooling and stirring. Ice water was introduced, and the suspension was extracted with 100 ml. chloroform. This was washed with water, then with sodium bicarbonate solution, and again with water. The chloroform solution was dried with sodium sulfate. Evaporation of the solvent left behind 9.2 g. solid, which was recrystallized from 70 ml. Skellysolve B. The yield of dodecyl 2-hydroxyethyl sulfoxide was 7.8 g., m.p. 71° C.

Dodecyl 2-mercaptomethylethyl sulfoxide, $C_{12}H_{25}SOCH_2CH_2SCH_3$. Metallic sodium, 1.15 g., was dissolved in 50 ml. ethyl alcohol, and to the cooled solution was added 4 ml. of condensed methanethiol, $CH_3SH$, and 14.0 g. dodecyl 2-chloroethyl sulfoxide. The suspension was heated on the water bath at 60° C. for 15 minutes. A test sample, titrated with standard acid (phenolphthalein) showed that the reaction was complete. The reaction product was poured into 500 ml. water, the solid filtered, and dried. The yield of dodecyl 2-mercaptomethylethyl sulfoxide was 14.4 g., mp. 67° C. The product was halogen-free. One gram was recrystallized from 4 ml. ethyl alcohol, giving 0.8 g., m.p. 68° C.

Dodecyl 2-ethoxyethyl sulfoxide, $C_{12}H_{25}SOCH_2CH_2OC_2H_5$. When the above reaction was repeated, except that the methanethiol was omitted, there was obtained dodecyl 2-ethoxyethyl sulfoxide, m.p. 58°C. Similarly, dodecyl 2-methoxyethyl sulfoxide was obtained when the solvent was methanol, and dodecyl 2-allyloxyethyl sulfoxide, when the solvent was allyl alcohol.

Dodecyl -2-(2-hydroxy)ethoxyethyl sulfoxide, $C_{12}H_{25}SOCH_2CH_2OCH_2CH_2OH$. Metallic sodium, 0.23 g., was dissolved in 10 ml. ethylene glycol, and to this was added 1.0 g. dodecyl 2-chloroethyl sulfoxide. The mixture was heated at 80° C. for 15 minutes. A homogeneous solution resulted. This was poured into 60 ml. cold water. The solid was extracted with 100 ml. ether, the ether solution was washed with water, dried with sodium sulfate, and the ether distilled. There was obtained 0.7 g. dodecyl-2-(2-hydroxy)ethyoxyethyl sulfoxide, m.p. 54° C.

EXAMPLE 3

Dodecyl glyceryl sulfoxide, compound No. 1 in the table was prepared from dodecyl thioglyceryl ether, $C_{12}H_{25}SCH_2CHOHCH_2OH$. The latter compound was in turn prepared according to a modification of the teachings of U. S. Pat. No. 1,987,526. To a solution of 5.2 grams metallic sodium in 130 ml. of ethyl alcohol, 95%, there was added 45 grams dodecyl mercaptan followed by 24.6 grams glyceryl alpha-monochlorohydrin. The mixture was refluxed for one hour on a water bath, and then poured into water. The product was extracted with 400 ml. of diethyl ether, washed with a sodium chloride solution and dried over anhydrous sodium sulfate. The ether was distilled off. The residue amounted to 54 grams and had a melting point of 47°–48° C. A solution of 26 grams of the crude thioglyceryl ether in 260 ml. of diethyl ether was cooled in ice. The crystals were filtered and washed with 50 ml. cold ether. The yield of pure dodecyl thioglyceryl ether, melting point 52° C., was 15.3 grams.

The compound was also prepared from 1-dodecene and alpha-thioglycerol, according to the equation:
$C_{10}H_{21}CH = CH_2 + HSCH_2CHOHCH_2OH$
   $= C_{12}H_{25}SCH_2CHOHCH_2OH$.

A mixture of 421 g. 1-dodecene (2.5 moles), 300 g. of commercial alpha-thioglycerol, assay 90 percent (2.5 moles), and 1.26 g. alpha, alpha-azodi-isobutyronitrile was heated on the water bath at 90° C., with stirring. After 20 minutes, the temperature rose to 125° C. The water bath was removed, and the reaction mixture was allowed to cool to 70° C. It was then poured, with stirring, into 4 liters of n-hexane. A complete solution resulted. The mixture was cooled in ice, the solid filtered off, and washed with 200 ml. cold n-hexane. The yield of dodecyl thioglyceryl ether, m.p. 51 °C., was 450 g. (65 percent of the theory).

Dodecyl glyceryl sulfoxide (A). Powdered dodecyl thioglyceryl ether, 5.0 g., was slowly added at room temperature to 25 ml. of concentrated nitric acid. This was treated with ice water, the solid filtered, washed with water, and dried. The yield of dodecyl glyceryl sulfoxide was 5.2 g., m.p. 83° C.

Dodecyl glyceryl sulfoxide (B). To a solution of 100 g. of dodecyl thioglyceryl ether in 600 ml. acetone there was slowly added, with cooling and stirring, 50 ml of 30 percent hydrogen peroxide. A homogeneous solution was obtained. This was allowed to stand at room temperature for 24 hours. The precipitate which had formed was washed with a mixture of 60 ml. acetone and 5 ml. water. The yield was 50 g., m.p. 85° C. The filtrate and washings were set aside for another 24 hours, when 26 grams of the sulfoxide were deposited, m.p. 80° C., making a total of 76 grams of dodecyl glyceryl sulfoxide.

Dodecyloxyethyl methyl sulfoxide, compound No. 2 of the table, was prepared as follows: First, the monododecyl ether of ethylene glycol was formed:

$C_{12}H_{25}Br + NaOCH_2CH_2OH = C_{12}H_{25}OCH_2CH_2OH + NaBr.$

The starting product represents a dodecyl alcohol + 1 mole ethylene oxide adduct. That is, by passing in one mole of ethylene oxide into one mole of dodecyl alcohol, the same product should theoretically be formed as from the reaction of dodecyl bromide and sodium glycol. Actually, a complex mixture is the result, with some unchanged lauryl alcohol, and considerable amounts of the lauryl alcohol — 2 mole ethylene oxide adduct. Still, for the preparation of a bleach-stable suds booster, the $C_{12}H_{25}OH + 1$ ETO adduct would be satisfactory. The hydroxyl group was then replaced with a halogen; and this in turn replaced by a methylmercapto group; and the product was finally oxidized with nitric acid.

$C_{12}H_{25}OCH_2CH_2OH + SOCl_2 = C_{12}H_{25}OCH_2CH_2Cl + SO_2 + HCl$ $C_{12}H_{25}OCH_2CH_2Cl + NaSCH_3 = C_{12}H_{25}OCH_2CH_2SCH_3 + NaCl$ $C_{12}H_{25}OCH_2CH_2SCH_3 + 2 HNO_3 = C_{12}H_{25}OCH_2CH_2SOCH_3 + 2NO_2 + H_2O$

For the preparation of the monododecyl ether of ethylene glycol, 10.5 g. of metallic sodium was dissolved, a little at a time, in 250 g. of hot ethylene glycol. There was then added 100 g. of dodecyl bromide. The mixture was refluxed four hours, cooled, and treated with water. The oil was extracted with 500 ml. ether, and the ethereal solution sulfate. After removal of the ether, the residue was fractionated. At an oil bath temperature of 225° C., the main fraction passed over at 170° C./15 mm. The yield was 61 g., or 66 percent of the theory.

To 23 g. of the monododecyl ether of ethylene glycol and 8 ml. pyridine, there was gradually added, with cooling and stirring, 16 ml. thionyl chloride. The mixture was heated on an oil bath at 100°–110° C. for 2 hours, with constant stirring. It was cooled, and excess thionyl chloride decomposed with water. The oil was extracted with 200 ml. ether, the ethereal solution washed with water, then with sodium bicarbonate solution, and again with water. The ether was distilled off, and the residue fractionated. The main fraction amounted to 17.4 g., b.p. 180° C./26 mm. (bath temperature 220° C.). Later it had been found that fractionation was unnecessary. The residue after the ether evaporation was satisfactory.

The dodecyloxyethyl chloride was converted into the sulfide thus: metallic sodium, 1.3 g., was dissolved in 60 ml. 3A alcohol, and to this was added 4 ml. of condensed methyl mercaptan and 12.4 g. of the chloride. The mixture was refluxed for 2 hours. Water was added, and the oil extracted with 200 ml. ether, the ether solution washed with water, and dried with sodium sulfate. Removal of the ether left a residue which was distilled, b.p. 140° C./1.00 mm. (bath temp. 200° C.). The yield of dodecyloxyethyl methyl sulfide was 12.1 g. This is a new compound.

The sulfide, 5.1 g., was added gradually to 12 ml. concentrated nitric acid. This was treated with ice and water, and the oil was extracted with 100 ml. chloroform. The chloroform solution was washed with water, sodium bicarbonate solution, again with water, and dried with anhydrous sodium sulfate. The solvent was evaporated in vacuum; towards the end, 25 ml. of n-hexane was added, and the evaporation continued. The yield of dodecyloxyethyl methyl sulfoxide was 5.0 g., m.p. 43° C.

Dodecyloxyethoxyethyl methyl sulfoxide, compound No. 6 in the table, was prepared by a procedure similar to that described for the dodecyloxyethyl methyl sulfoxide, according to the following equations:

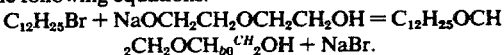
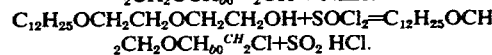
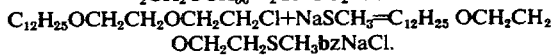
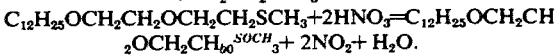

The reaction product of monosodium diethylene glycol with dodecyl bromide represents the pure 100% adduct of lauryl alcohol with 2 moles of ethylene oxide ($C_{12}H_{25}Oh + 2ETO$). The following two intermediates are new compounds:

Dodecyloxyethyoxyethyl chloride, $C_{12}H_{25}OCH_2CH_2OCH_2CH_2Cl$,
b.p. 150° C./1.5 mm. (oil bath temp. 210° C.).

Dodecyloxyethoxyethyl methyl sulfide, $C_{12}H_{25}OCH_2CH_2OCH_2H_2SCH_3$,
b.p. 155° C./1.5 mm. (bath temp. 225° C.).

EXAMPLE 4

A powdered detergent composition containing the sulfoxides of this invention as a foam stabilizing additive was prepared to have the following composition.

| Ingredient | Percent |
| --- | --- |
| Sodium tetrapropylene benzenesulfonate | 18.0 |
| Sulfoxide | 3.5 |
| Sodium toleneuslfonate | 2.5 |
| Tetrasodium pyrophosphate | 25.0 |
| Pentasodium tripolyphosphate | 15.0 |
| Sodium silicate | 6.0 |
| Sodium carboxymethylcellulose | .5 |
| Water | 7.0 |
| Sodium sulfate and miscellaneous ingredients | 22.5 |
| Total: | 100.0 |

The following sulfoxides were separately evaluated in the above formula: dodecyl glyceryl sulfoxide, dodecyloxyethyl methyl sulfoxide, dodecyloxyethoxyethyl methyl sulfoxide, dodecyl 2-mercaptomethylethyl sulfoxide and dodecyl acetonyl sulfoxide. The volume of foam produced in aqueous solutions of these compositions is equal or superior to that obtained using prior art foam stabilizers. In addition, the foam remains stable for a longer period of time than foams heretofore obtained.

What is claimed is:

1. Dodecyl acetonyl sulfoxide.

* * * * *